Patented Feb. 7, 1928.

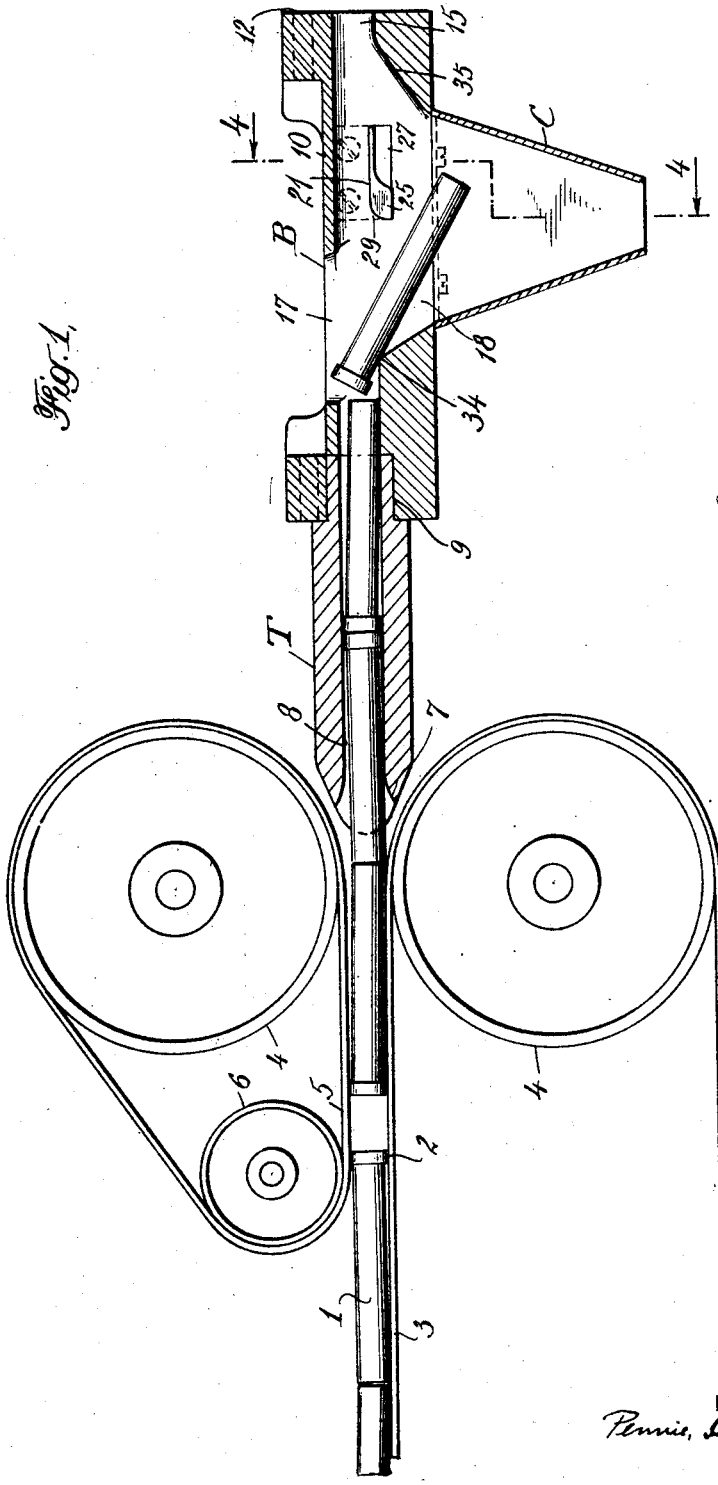

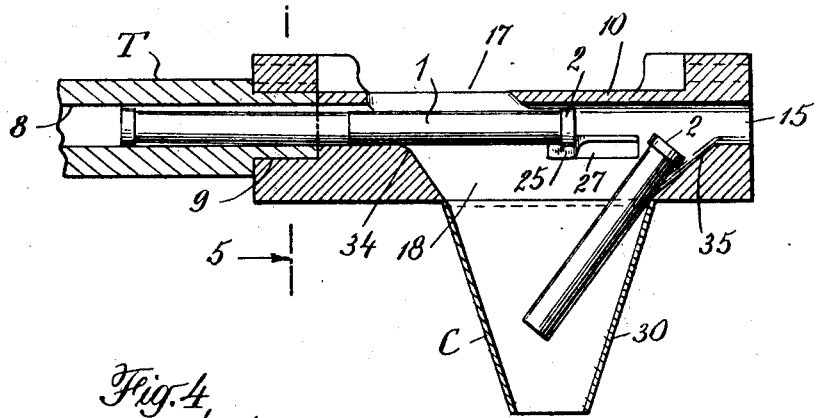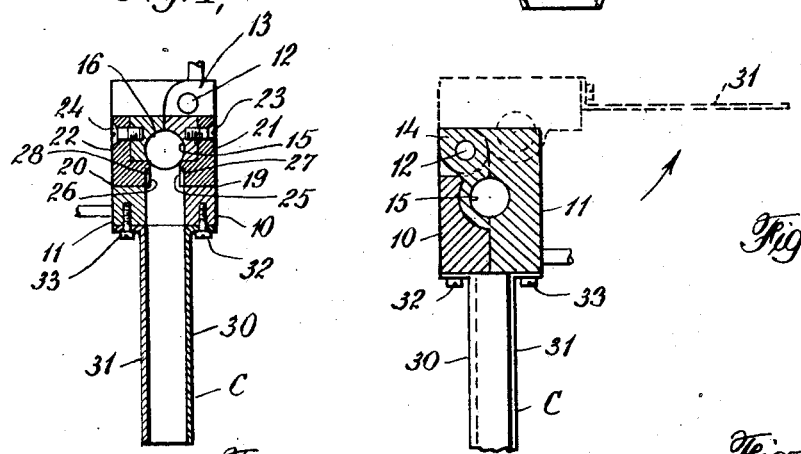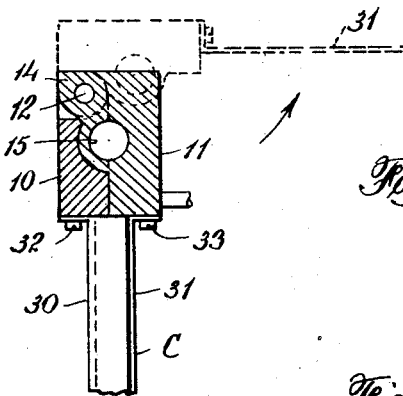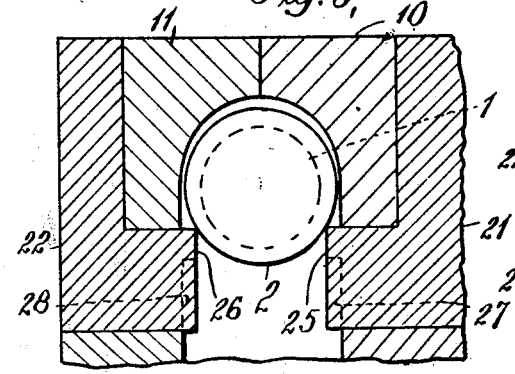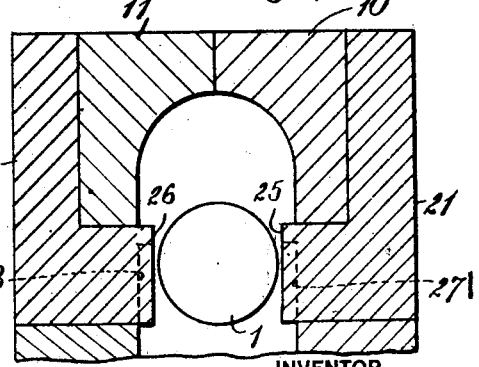

1,658,428

UNITED STATES PATENT OFFICE.

CLIFFORD S. CHARLES, OF NEW HAVEN, CONNECTICUT, ASSIGNOR TO WINCHESTER REPEATING ARMS COMPANY, OF NEW HAVEN, CONNECTICUT, A CORPORATION OF CONNECTICUT.

CARBON-PENCIL-FEEDING MECHANISM.

Application filed August 19, 1926. Serial No. 130,162.

This invention relates to automatic machinery for use in the manufacture of electric cells or similar devices, and more particularly concerns a mechanism for automatically feeding capped carbon electrodes or pencils to a tamping machine or other device with their capped ends in a predetermined relation.

In the manufacture of electric cells of the type commonly known as dry cells, the positive or central electrode is usually formed of carbon, and in order to obtain a good electrical connection between such carbon electrode or pencil, as it is sometimes called, and the external electrical circuit, as well as to protect the protruding end of such electrode, a cap of brass, copper or other suitable conducting material is secured over one end thereof. The cells are usually made by machinery, and as the cell cores are ordinarily formed in the upright position, it is necessary that the pencils or central electrodes be fed to the core-forming machine in the upright position, that is, with the capped ends of the pencils uppermost.

With the above considerations in mind, it is an object of the present invention to provide a mechanism for continuously and automatically arranging capped central electrodes or pencils for dry cells with their capped ends upward, and for feeding these pencils to a tamping or core-forming machine in this position.

It is a further object of this invention to provide a mechanism of this character which is simple, rugged and inexpensive, and which is so arranged and formed as to provide ready access to the interior thereof for the purpose of adjustment and for the removal of broken pencils.

Other specific objects, advantages, and characteristic features of the present invention will be pointed out or will become apparent as the description thereof progresses.

In describing the invention in detail, reference will be made to the accompanying drawings, in which Figure 1 is a sectional side elevation of the mechanism comprising the present invention, together with the means for feeding the pencils to this mechanism;

Figure 2 is a plan view of the mechanism;

Figure 3 is a sectional side elevation showing the pencils in the process of being arranged by the mechanism;

Figure 4 is a section on the line 4—4 of Figure 1;

Figure 5 is a section on the line 5—5 of Figure 3;

Figure 6 is an enlarged section through the gage-blocks showing the capped end of a pencil therebetween; and Figure 7 is an enlarged section similar to that shown in Figure 6, showing the uncapped end of a pencil between the gage-blocks.

Referring to the drawings, the mechanism of the present invention comprises, in general, a pencil reversing box B, provided with a feed tube T and a delivery chute C. The pencils 1 are fed through the feed tube T to the reversing box B, there arranged in a predetermined relation end for end, and delivered through the delivery chute C to a battery-tamping or cell-forming machine (not shown).

The pencils 1 comprise cylindrical carbon rods which are provided at one end with caps 2 of brass or other suitable conducting material. These caps 2 are fixed to the pencils in any suitable manner by a machine designed for that purpose, and are fed from a suitable container or hopper (not shown) to the belt 3, carried by the pulley 4. The belt 3, together with the belt 5, carried by the pulleys 6 and 4, deliver the pencils to the feed tube T, the enlarged capped ends 2 of the pencils being frictionally engaged between the belts, and the pencils being suitably guided so as to enter the feed tube T in longitudinally aligned relation.

The feed tube T is provided with a bore or central opening 8 of slightly larger diameter than the outside diameter of the capped ends 2 of the pencils, and is provided at one end with an enlarged and flared opening, shown at 7, whereby the pencils are guided into the central opening 8. The feed tube T is pressed, screw-threaded or otherwise suitably connected to the reversing box B, the reduced end portion 9 of the feed tube entering an opening in the end of the box.

The reversing box B is formed in two sections, a fixed rear section 10, and a movable front section 11, which is hinged to the rear section by means of the pins 12 passing through the cooperating ears 13 and 14 formed integral with the sections 10 and 11 respectively. Each of the sections 10 and 11 is provided with a substantially semi-circular groove or opening 15, which grooves cooperate to form a substantially cylindrical passage 16 through the box when the two sections are closed together, as most clearly shown in Figure 4. The sections 10 and 11 are cut away at their upper and lower faces to form the upper and lower openings 17 and 18, as shown in Figure 1. The lower opening 18 is tapered downwardly to form a passageway which is slightly smaller at the lower edge of the box than it is at the opening from the cylindrical portion 15.

Just beyond the center of the cylindrical chamber 15, an opening 19 is formed in the box section 10, and directly opposite this opening, in the box section 11, is formed a corresponding opening 20. Two gage-blocks 21 and 22 are secured in the openings 19 and 20 by means of the machine screws 23 and 24 respectively. These gage-blocks 21 and 22 are provided with inwardly projecting portions 25 and 26 which extend into the central cylindrical chamber 15 of the reversing box at a point slightly below the horizontal diameter thereof. These gage-blocks are so disposed and arranged as to be a distance apart slightly greater than the outside diameter of the carbon pencil 1, but are slightly closer together than the outside diameter of the metallic caps 2 of the pencils. The arrangement of the gage-blocks 21 and 22 with respect to the diameters of the capped and uncapped portions of the pencil 1 is shown in Figures 6 and 7 respectively. The gage-blocks 21 and 22 are provided, at their lower edges, with cut-away portions 27 and 28, these cut-away portions being located at the ends of the gage-blocks which are remote from the feed tube end of the reversing box, as most clearly shown in Figure 1. The ends of the gage blocks which extend toward the feed tube T are slightly rounded or beveled, as shown at 29.

A delivery chute C is secured to the lower face of the reversing box B, and comprises a trough-shaped rear section 30 and a front section or cover plate 31, these sections being secured to the reversing box sections 10 and 11 respectively by means of screws 32 and 33, as clearly shown in Figure 4. The delivery chute C is tapered toward this lower end, as shown in Figure 1, and is usually arranged in close proximity to a delivery tube or other suitable means for transferring the pencils to a cell-forming machine in end to end relation.

In the operation of the mechanism described, the capped pencils 1 are delivered to the belt 2 and there arranged in longitudinal alignment by guides or other suitable means. The pencils are then delivered to the feed tube T by the belt 3 and the cooperating belt 5, these belts being continuously driven from the pulleys 4 and 6, which in turn are driven by a suitable source of power, not shown. The arrangement of the pencils 1 as they enter the tube T will be entirely haphazard, some entering with their capped ends leading, and others with their uncapped ends leading. Assume for the moment that a pencil enters the tube T with the uncapped end leading. As the pencil enters the reversing box, being pushed along by the following pencils, it is held in a substantially horizontal position by the cylindrical shape of the chamber 15 until the uncapped end has passed to a point between and above the gage-blocks 21 and 22. At this point the capped end 2 of the pencil passes into the space below the upper openings 17 of the box, and here swings upwardly into this opening, as shown in Figure 1, the uncapped end passing downwardly between the gage-blocks 21 and 22, as shown in Figure 7, into the delivery chute C, the entire pencil being pivoted about the point 34 at the edge of the tapered lower opening 18 of the box B. As explained above, the gage-blocks are arranged a sufficient distance apart to permit the passage of the uncapped end of the pencil 1 therebetween. The pencil is thus dropped into the delivery chute C and passes on into the cell-forming machine with the uncapped end downward.

Now assume that a pencil 1 enters the reversing box B with its capped end foremost. In this case, as the pencil is pushed into the box, its capped end 2 is engaged between and supported by the gage-blocks 21 and 22 before the uncapped end passes under the upper opening 17, the beveled portion 29 of the gage-blocks guiding the capped end of the pencil to a position therebetween, as shown in Figure 6. The pencil is thus maintained in a horizontal position, the capped end being supported by the gage-blocks and the uncapped end being supported by the cylindrical chamber 15 of the reversing box B. As soon as the uncapped end of the pencil 1 is pushed beyond the point 34 at the edge of the lower opening 18 of the box, this uncapped end falls downwardly, as shown in Figure 3, the capped end falling beyond the gage-blocks 21 and 22 and striking the tapered edge 35 of the opening 18, thus swinging the pencil to a position in which it will enter the delivery chute C with the uncapped end downward. The cut-away portions 27 of the gage-blocks 21 and 22 permit the capped end 2 of the pencil 1 to pass between the gage-blocks and the inclined face 35 of the opening 18. The pencil is thus delivered through the chute C to the cell-forming machine with its capped end uppermost.

If it becomes necessary to open the box B for the purpose of making an adjustment or in order to permit the removal of a broken pencil, the section 11, together with the plate 31 of the delivery chute C, is swung outwardly and upwardly from the section 10 to the position shown in broken lines in Figure 5. The feed tube T may be secured to either of the sections 10 and 11, but is preferably secured to the section 11 and swings outwardly with this section for inspection and cleaning.

From the above description of the mechanism and its operation, it is evident that no matter in what relation the pencils 1 are delivered to the reversing box B, they will be continuously delivered through the delivery chute C in a predetermined relation: that is, arranged end for end with their capped ends uppermost. Due to the fact that the box B is made in two sections which are hinged together, the interior thereof is readily accessible for the purpose of cleaning or adjusting the gage-blocks 21 and 22, or to permit the removal of fragments of broken pencils. In this connection, it should be observed that the design of the reversing box B is such that there is very little likelihood of the pencils becoming jammed or broken therein, all of the surfaces and guides with which the pencils come into contact being rounded or beveled to prevent their cutting or jamming the pencils.

Although the present invention has been described in connection with one specific form of mechanism, it should be clearly understood that the invention is not limited to the particular embodiment shown, and that certain changes and modifications may be made in the design of the mechanism without departing from the scope of the invention as defined by the appended claims.

I claim:

1. In a mechanism for arranging, in a predetermined relation, elongated cylindrical objects having a uniform diameter throughout substantially their entire length and having a portion of an enlarged diameter at one end thereof, a box having a horizontal chamber and a downwardly extending opening connected thereto, means for feeding said objects into said chamber in longitudinally aligned relation, and means in said chamber for supporting said enlarged portions of said objects but not the remaining cylindrical portions of said objects, whereby said objects are permitted to drop through said opening only with their enlarged cylindrical ends uppermost.

2. In a mechanism for arranging, in a predetermined relation, elongated cylindrical objects having enlarged portions at one end, a reversing box having a horizontal cylindrical chamber and a lower opening connected therewith, means for feeding said objects into said box in longitudinally aligned relation, and means in said horizontal chamber, over said lower opening, for cooperating with and supporting the enlarged ends of one of said objects while the small end thereof is supported by one edge of said opening to prevent said objects from entering said opening with their enlarged ends downward.

3. In a mechanism for arranging, in a predetermined relation, elongated cylindrical objects having enlarged capped ends, a reversing box having a longitudinally extending cylindrical chamber and an opening in the lower side of the box connected with said chamber, means for feeding said objects into said chamber in longitudinally aligned relation, and spaced means protruding from opposite sides of said chamber over said opening for momentarily engaging said cappend ends of said objects when said objects are fed into said chamber with their capped ends leading, said protruding means being spaced a sufficient distance apart to permit the uncapped portions of said objects to drop into said opening, whereby said objects are dropped into said opening with their uncapped ends downward.

4. In a mechanism for arranging capped electrodes for batteries in a predetermined relation, a reversing box having a longitudinally extending cylindrical chamber and a downwardly extending tapered opening connected with said chamber, means for pushing said electrodes into said chamber in alined relation, and gage blocks protruding into said chamber from opposite side walls thereof, said gage blocks being spaced apart a distance greater than the diameter of the uncapped portions of said electrodes but less than the diameter of the capped ends of said electrodes, whereby an electrode pushed into said chamber with its uncapped end leading is permitted to fall between said blocks and to enter said opening with its uncapped end downward, and an electrode pushed into said chamber with its capped end leading is maintained in a substantially horizontal position by the engagement of its capped end with said gage-blocks until its uncapped end falls downwardly through said opening.

5. In a mechanism for arranging capped carbon pencils for battery cells, a reversing box having a longitudinally extending chamber and a downwardly tapered lower opening connected to said chamber, a feed tube connected to said box and having a central opening cooperating with said chamber, means for continuously pushing capped carbon pencils into said chamber through said feed tube, and means for causing said pencils to drop through said lower opening in said reversing box with their capped ends uppermost, regardless of which end of said pencils enters said chamber first, comprising, two gage-blocks protruding into said chamber from the opposite side walls thereof at a point above said lower opening, said gage-blocks being spaced apart a distance less than the diameter of the capped ends of said pencils and greater than the diameter of the uncapped portions of said pencils, whereby a pencil entering said box with the uncapped end leading may drop directly through said opening with the capped end uppermost, and a pencil entering said box with the capped end leading is supported in a horizontal position by the engagement of the gage-blocks with its cap until the uncapped end thereof drops into said opening.

6. In a mechanism for arranging capped carbon pencils in a predetermined relation, a reversing box comprising two sections having cooperating grooves and cut-away portions forming a horizontal chamber connected with a lower opening, means for removably retaining said sections in cooperating relationship, means for pushing capped carbon pencils into said chamber in longitudinally aligned relation, an inwardly protruding extension in the interior of said chamber for engaging the capped ends of said pencils and permitting said pencils to drop through said lower opening with their capped ends uppermost, regardless of the direction in which said pencils are pushed into said box.

7. In a mechanism for arranging capped carbon pencils for dry cells in a predetermined relation, a reversing box comprising two cooperating sections having grooves and cut-away portions on the cooperating surfaces thereof forming a horizontal cylindrical chamber connected with an opening in the lower side of the box, hinged means for removably securing said sections in cooperating relation, means for pushing capped carbon pencils into said chamber in longitudinally aligned relation, and oppositely disposed gage-blocks removably secured in the walls of said chamber over said lower opening, and protruding into the interior of said chamber for engaging the capped ends of said pencils and dropping said pencils through said opening with their capped ends uppermost, regardless of the direction in which said pencils are pushed into said box.

8. In a mechanism for arranging capped carbon pencils for dry cells in a predetermined relation, a reversing box comprising two cooperating sections having grooves therein which cooperate to form a horizontal chamber opening into a downwardly extending tapered passage, hinged means at the upper edges of said sections for hingedly securing said sections together, means for pushing carbon pencils into said chamber in longitudinally aligned relation, said pencils having one end thereof provided with an enlarged cap, means in said chamber for dropping said pencils through said passage with their capped ends uppermost regardless of which end of said pencils enters said chamber first, and a downwardly tapered delivery chute surrounding the lower end of said passage, said delivery chute comprising two cooperating sections, each secured to one of said reversing box sections.

9. In a mechanism for arranging, in a predetermined relation, carbon pencils provided with enlarged caps at one end, a reversing box having a horizontally extending chamber and lower and upper openings communicating with said chamber, means for pushing capped carbon pencils into said chamber in longitudinally aligned relation, and means extending into the interior of said chamber for engaging the capped ends of the pencils which enter said chamber with their capped ends leading and dropping such pencils through said lower opening with their capped ends upward, said upper opening permitting the capped ends of the pencils which enter said chamber with their uncapped ends leading to swing upwardly as their uncapped ends swing downwardly into said lower opening.

10. In a mechanism for arranging, in a predetermined relation, capped carbon pencils for dry cells, the capped ends of said pencils having a greater diameter than the uncapped portions thereof, a reversing box having a horizontal chamber communicating with a downwardly extending opening, means for pushing said pencils into said chamber in longitudinally aligned relation, the pencils which enter said chamber with their uncapped ends leading being dropped directly through said lower opening with their capped ends upward, and means in said chamber for reversing the pencils which enter said chamber with their capped ends leading, comprising inwardly protruding oppositely disposed extensions for engaging the capped ends of said pencils and maintaining said pencils in a substantially horizontal position until the uncapped ends thereof fall downwardly into said opening.

In testimony whereof I affix my signature.

CLIFFORD S. CHARLES.

CERTIFICATE OF CORRECTION.

Patent No. 1,658,428.                              Granted February 7, 1928, to

CLIFFORD S. CHARLES.

It is hereby certified that error appears in the printed specification of the above numbered patent requiring correction as follows: Page 3, line 85, claim 3, for the word "cappend "read "capped" and line 100, claim 4, for the misspelled word "alined" read "aligned"; and that the said Letters Patent should be read with these corrections therein that the same may conform to the record of the case in the Patent Office.

Signed and sealed this 6th day of March, A. D. 1928.

Seal.                                                               M. J. Moore,
                                                               Acting Commissioner of Patents.